United States Patent
Kourtellis et al.

(10) Patent No.: US 11,917,405 B2
(45) Date of Patent: Feb. 27, 2024

(54) METHOD AND SYSTEM FOR AUTHENTICATING USERS OF MOBILE COMMUNICATION DEVICES THROUGH MOBILITY TRACES

(71) Applicant: Telefónica Cybersecurity & Cloud Tech, S.L.U., Madrid (ES)

(72) Inventors: Nicolas Kourtellis, Madrid (ES); Aruna Prem Bianzino, Madrid (ES); Sergio De Los Santos Vilchez, Madrid (ES)

(73) Assignee: Telefónica Cybersecurity & Cloud Tech, S.L.U., Madrid (ES)

( * ) Notice: Subject to any disclaimer, the term of this patent is extended or adjusted under 35 U.S.C. 154(b) by 24 days.

(21) Appl. No.: 17/684,468

(22) Filed: Mar. 2, 2022

(65) Prior Publication Data
US 2022/0286852 A1 Sep. 8, 2022

(30) Foreign Application Priority Data
Mar. 2, 2021 (EP) .................................... 21382175

(51) Int. Cl.
*H04W 12/065* (2021.01)
*H04W 12/61* (2021.01)
(Continued)

(52) U.S. Cl.
CPC ........... *H04W 12/065* (2021.01); *H04W 4/14* (2013.01); *H04W 12/61* (2021.01); *H04W 12/69* (2021.01)

(58) Field of Classification Search
CPC ..... H04W 12/065; H04W 4/14; H04W 12/61; H04W 12/69; H04W 12/63; H04W 12/68;
(Continued)

(56) References Cited

U.S. PATENT DOCUMENTS 8,892,461 B2 11/2014 Lau et al.
10,303,864 B2 5/2019 Blake et al.
(Continued)

OTHER PUBLICATIONS

Supplementary European Search Report and the European Search Opinion dated Aug. 20, 2021 From the European Patent Office Re. Application No. EP 21382175. (6 Pages).
(Continued)

*Primary Examiner* — Quazi Farooqui

(57) ABSTRACT

A method and system for user authentication through mobility traces comprising:
retrieving and processing (401, 411) data records stored in a network events database (14), the data records comprising data of one or more interactions (101) of the user with at least one network element (12) through a mobile device (11) of the user, a timestamp (T) associated with the recorded interactions, a unique identifier of the mobile device (11), a unique identifier of the user and a unique identifier of the network element (12);
computing (103) at least one network interaction track, NIT, by using the retrieved data;
using the at least one computed NIT (402, 412) to obtain an authentication result, e.g., based on a computed authentication probability ($P_i$), indicating either a success or a failure of the user authentication to be returned to a third-party service provider (21) requesting the user authentication status check (202, 302).

8 Claims, 4 Drawing Sheets

(51) Int. Cl.
*H04W 12/69* (2021.01)
*H04W 4/14* (2009.01)

(58) Field of Classification Search
CPC ..... G06F 2221/2111; G06F 2221/2139; G06F 21/316; H04L 2463/082
See application file for complete search history.

(56) References Cited

U.S. PATENT DOCUMENTS

| | | | |
|---|---|---|---|
| 10,630,673 B1* | 4/2020 | Lingampally | G06F 21/41 |
| 2011/0185055 A1 | 7/2011 | Nappier et al. | |
| 2018/0069896 A1 | 3/2018 | Urmanov et al. | |
| 2018/0072539 A1 | 3/2018 | Dankar et al. | |
| 2020/0380104 A1* | 12/2020 | Deutschmann | G01S 7/417 |
| 2022/0124498 A1* | 4/2022 | Dymek | H04W 24/08 |

OTHER PUBLICATIONS

Colegio Alkor "Metodologías Activas: Innovación Pedagógica", Colegio Alkor, Newed, Departamento de Innovacion, 6P., Mar. 2, 2022.

Golle et al. "On the Anonymity of Home/Work Location Pairs", Proceedings of the 7th International Conference on Pervasive Computing: 390-397, May 2009.

Wang et al. "De-Anonymization of Mobility Trajectories: Dissecting the Gaps between Theory and Practice", Network and Distributed Systems Security (NDSS) Symposium, San Diego :15P., Feb. 18-21, 2018.

\* cited by examiner

METHOD AND SYSTEM FOR AUTHENTICATING USERS OF MOBILE COMMUNICATION DEVICES THROUGH MOBILITY TRACES

RELATED APPLICATION

This application claims the benefit of priority of Europe Patent Application No. 21382175.4 filed on Mar. 2, 2021, the contents of which are incorporated by reference as if fully set forth herein in their entirety.

FIELD AND BACKGROUND OF THE INVENTION

The present invention has its application within the information and communications technologies for telecommunication networks, more specifically, relates to wireless communication networks and mobile communication user devices.

More particularly, the present invention refers to a method and system of user authentication through mobility traces.

Mobile communication devices, such as mobile phones, tablets, notebooks, etc., are frequently used every day. These devices are used by users to engage with an enormous range of online and offline services, including critical ones, such as bank operations, control of remote actuators, document signature, etc. The use of mobile communication devices to provide an everyday wider range of services makes essential a security environment where the mobile device and the user operating it (i.e., the person to which the service is provided) are univocally identified, to ensure that the service is provided to the correct user and not to an unauthorized user.

Some services require a one-time authentication. Examples of these services may be allowing a user to perform a specific operation on a remote service, opening a door, etc. Other services require a continuous-time authentication. Examples of these services may be using a vehicle, accessing a resource whose usage is regulated on the basis of time, etc.

The need of identifying users interacting with different types of services is closely related to the prevention of identity theft. However, privacy of users must also be considered. To this extent, it is of extreme interest to establish whether users are who they claim to be, while guaranteeing confidentiality about the exchanged information in such process.

The user identification process is usually based on some credentials, whose ownership and verification guarantee to verify the user's identity. The used credentials are usually emitted by a trusted authority and, theoretically, are extremely difficult to falsify/copy, allowing to determine whether the user corresponds to who they claim to be or not. A proper validation or authentication mechanism is then designed to validate the information that the user brings to access the requested service. The carried information provided by the user usually falls into one of the following categories:

- something that the user knows (e.g., a secret keyword),
- something that the user owns (e.g., a physical object also called physical token, like a smartcard, a SIM card, an NFC tag, etc.),
- something that the owner is (e.g., any measurable physical feature, univocally identifying the user, like fingerprint or iris identification),
- something that the user does (e.g., motion pattern, signature, etc.),
- or somewhere that the user is (e.g., being in a specific location).

This information is what is known as identifier or credential. Sometimes, a combination of information belonging to different of these categories is used, to improve security.

Many user authentication services are based on two-factor authentications that include the possibility to port a telephone number to a new SIM (e.g., in case of phone loss or theft). If an attacker can convince a network provider to port a phone number to a fraudulent SIM, or receive a duplicate SIM for a given number, then, they can receive all the SMS or calls intended to unlock a second factor of authentication (e.g., one-time passwords). This is called SIM swap attack.

The effectiveness of any authentication solution cannot be measured only in terms of security—since many of them are equivalent in that aspect—but rather accounting also for usability, ease of implementation, and cost and energy consumption. Only by keeping into account all these aspects at the same time it is possible to obtain a wide adoption of the authentication solution by the users.

The current authentication methods are keen to three major problems:

1. The authentication represents an invasive experience for users, which must actively authenticate themselves, by scanning some object (token, card, etc.), or some characteristic (iris, face, voice, fingerprint, etc.), or by executing specific gestures or specific sequences (signature, password, etc.).
2. User credentials (password, token, or event fingerprint, etc.) are subject to copy or theft by malicious external observers, which can then access the objective service/asset by faking their identity to the one of an authorized user.
3. Authentication factors involving the user, including one-time password transmission (e.g., through SMS or call), can lead to hacking, including interception or device cloning.

In a wireless communication network such as a mobile network, users interact with the network elements (e.g., Access Points—APs) in different ways (e.g., calls, SMS, data transmission, etc.) almost all the time. It has been proven that these interactions follow a unique pattern for different users on the basis of their habits and may be used to build a unique profile that can be used as user authentication element.

A number of research studies have demonstrated how the inherent nature of location data, as well as the patterns hidden in it, can be used to assess the uniqueness of users. For example, P. Golle and K. Partridge disclose in "On the anonymity of home/work location pairs" (Pervasive computing, 2009) the use of census data to demonstrate the uniqueness of home/work location pairs across a fraction of the US population. Another example is disclosed in "De-anonymization of mobility trajectories: Dissecting the gaps between theory and practice" by Wang et al. (NDSS, 2018), describing an experiment on a large-scale dataset containing the mobility trajectories of 2.1M users of a Chinese mobile network and two external datasets corresponding to a subset of the same user population as obtained from a social network (Weibo) and a check-in service (Dianping), to evaluate the performance of various mobility trajectory de-anonymization algorithms. The results of the experiment demonstrate that existing methods under-estimate spatio-temporal mismatches, as well as the noise in the data generated from various sources, and the authors propose novel algorithms to account for both.

User location can be gathered using a GPS positioning system but the usage of GPS positioning presents some major limitations, including:

GPS positioning offers a lower accuracy with respect to positioning.

Using GPS positioning requires the data to be gathered on the user device.

GPS positioning results in a much higher energy consumption, which is especially relevant in the case of mobile device.

Further examples of existing solutions for user authentication are listed below. U.S. Pat. No. 10,303,864B2 describes a system for continuous authentication of mobile users. The authentication is based on the pressure the user applies on the keys of the virtual keyboard in the touchscreen of the mobile device, which is compared to the one of a trusted profile. The data used to authenticate the user is biometric (i.e., pressure pattern on the touch screen) and collected on the mobile device itself. Finally, this solution only authenticates the user and not the set {device, user, SIM card}.

U.S. Pat. No. 8,892,461B2 describes a system for user authentication based on an analysis of the mobile device user behavior. The user location is tracked to generate a mobility trace for the user. The user is then authenticated on the basis of a comparison between the mobility trace and a previous record for the same user. The used data is collected on the user phone and the authentication is performed on the user phone. The authentication is provided only to the user and not to the set user/device/SIM card.

Therefore, there is a need in the state of the art for providing networks with mechanisms non-invasive for users, easy to implement and highly reliables against fakes and hackers for a continuous authentication of the end-users of services in mobile devices.

SUMMARY OF THE INVENTION

The present invention solves the aforementioned problems and overcomes previously explained state-of-art work limitations by providing a method and system for the (continuous-time or single-use) authentication of mobile users which is executed using the sequence of user interactions with the network and the network elements as authentication factor, and still accounting for high reliability.

The present invention builds its methodology using mobility traces that are generated from mobile network events at the network provider's side, based on the user's activity and mobility. These events may have a coarser spatio-temporal granularity than, for instance, GPS traces, but scale well to country-level regions and populations. Importantly, mobile network events have a much finer granularity compared to trajectories derived by, for instance, Call Detail Records (CDRs), which can feature more than two orders of magnitude fewer events.

An aspect of the present invention refers to a method for authenticating users of mobile devices through mobility traces which comprises the following steps:

recording at least one user interaction with at least one network element through a mobile communication device of the user subscribed in a network service provider;

recording by the at least one network element al least the following data: a timestamp associated with the following recorded interactions, a unique identifier of the user, a unique identifier of the user's mobile device and a unique identifier of the network element;

computing a network interaction track (NIT) by the network service provider using all the data recorded in the previous steps, the NIT is defined as an array of the aforementioned information received by the network service provider associated with each network interaction of the user, including the record of the user interaction, the timestamp and the respective unique identifiers of user, mobile device and network element involved in the user interaction;

using the computed NIT to obtain an authentication result at the network service provider indicating either a success or a failure of the user authentication.

Another aspect of the present invention refers to a system implementing the user authentication method described above.

The method and system in accordance with the above described aspects of the invention has a number of advantages with respect to the aforementioned prior art, which can be summarized as follows:

The present invention represents a highly reliable authentication solution for user authentication in mobile networks, while being usable, easy to implement, simple, cheap and with minimum energy consumption.

The present invention protects the user from a sim-swap attack, as—even if the attacker is able to obtain the privileges of the attacked user through their SIM—the attacker will not be able to replicate the user NIT, resulting hence in a difference between the stored NIT of the victim user, and the "new" NIT created by the attacker. The difference cannot be mimicked, even if the attacker can convince the provider of a change of mobile SIM card.

The data gathered in the present invention, unlike data collected via GPS, do not require additional operations because are naturally gathered by the operator in any case while continuously providing communication service to the user. Furthermore, using GPS positioning requires the data to be gathered on the user device, while in the present invention data collecting is performed in a $3^{rd}$ party device (i.e., telco device). The data used by the present invention for the user authentication is generated and stored in the provider network, not in the mobile device, and cannot be altered by the user. Any user authentication using personal traits of users collected via phone or related sensors are not relevant to the present invention, since these sensors and systems rely on input collected from users' activity (either passively or actively) on the device side. On the contrary, the the present invention is focused on data passively collected on the network or infrastructure side from a telecommunication service provider. This is an entity that the user has an already established trust relationship, and the user can outsource the request of a third-party application for continuous authentication, without consuming its device's resources.

Furthermore, no user intervention in the process is needed: No interception nor device cloning is possible, no copiable/stealable/losable values/objects (password, tokens, etc.) are used, and the process is transparent for the user.

User privacy is guaranteed, as the content of the network interaction is not recorded, only the kind, timestamp, and the network element with which the interaction takes place are stored in the provider network.

The present invention aims at a service for "alternative-factor-authentication", which allows both continuous authentication and single-use authentication This falls along the lines of other such services like "second-factor-authentication" services, which use SMS, email, phone calls, etc., to authenticate the identity of a user trying to access a 3$^{rd}$ party service via the usage of another channel of communication, apart from the basic login and password of said service.

The network infrastructure for implementing the present invention is already available and does not need be built.

These and other advantages will be apparent in the light of the detailed description of the invention.

BRIEF DESCRIPTION OF THE SEVERAL VIEWS OF THE DRAWINGS

For the purpose of aiding the understanding of the characteristics of the invention, according to a preferred practical embodiment thereof and in order to complement this description, the following Figures are attached as an integral part thereof, having an illustrative and non-limiting character.

DESCRIPTION OF SPECIFIC EMBODIMENTS OF THE INVENTION

The embodiments of the invention can be implemented in a variety of architectural platforms, operating and server systems, devices, systems, or applications. Any particular architectural layout or implementation presented herein is provided for purposes of illustration and comprehension only and is not intended to limit aspects of the invention.

A preferred embodiment of the invention relates to a system implementing a method of user authentication, which may be continuous(-time) or single(-use) authentication, through mobility traces.

Figure 1:
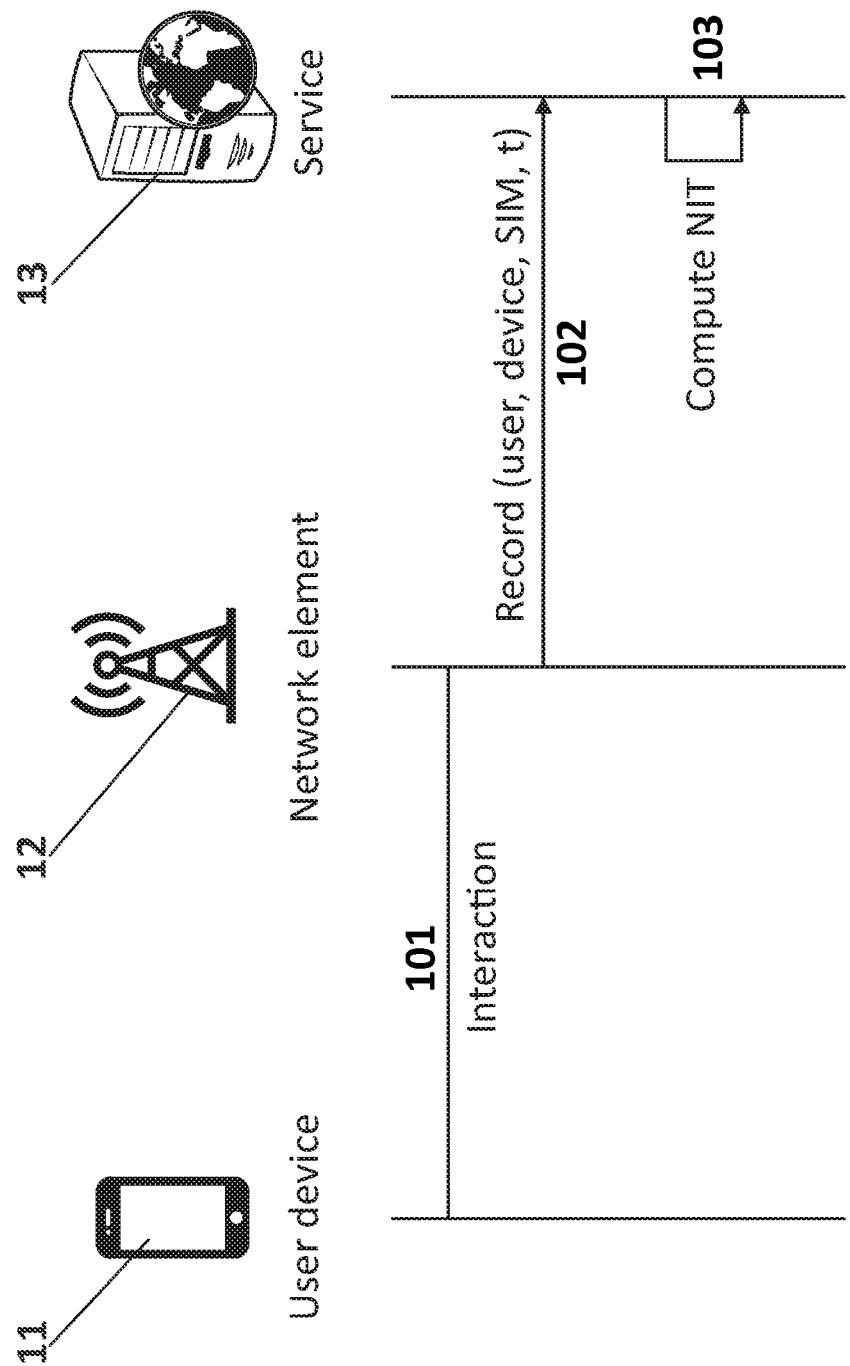
FIG. 1 shows a time diagram of a sample interaction between a mobile device and network elements.
Figure 2:
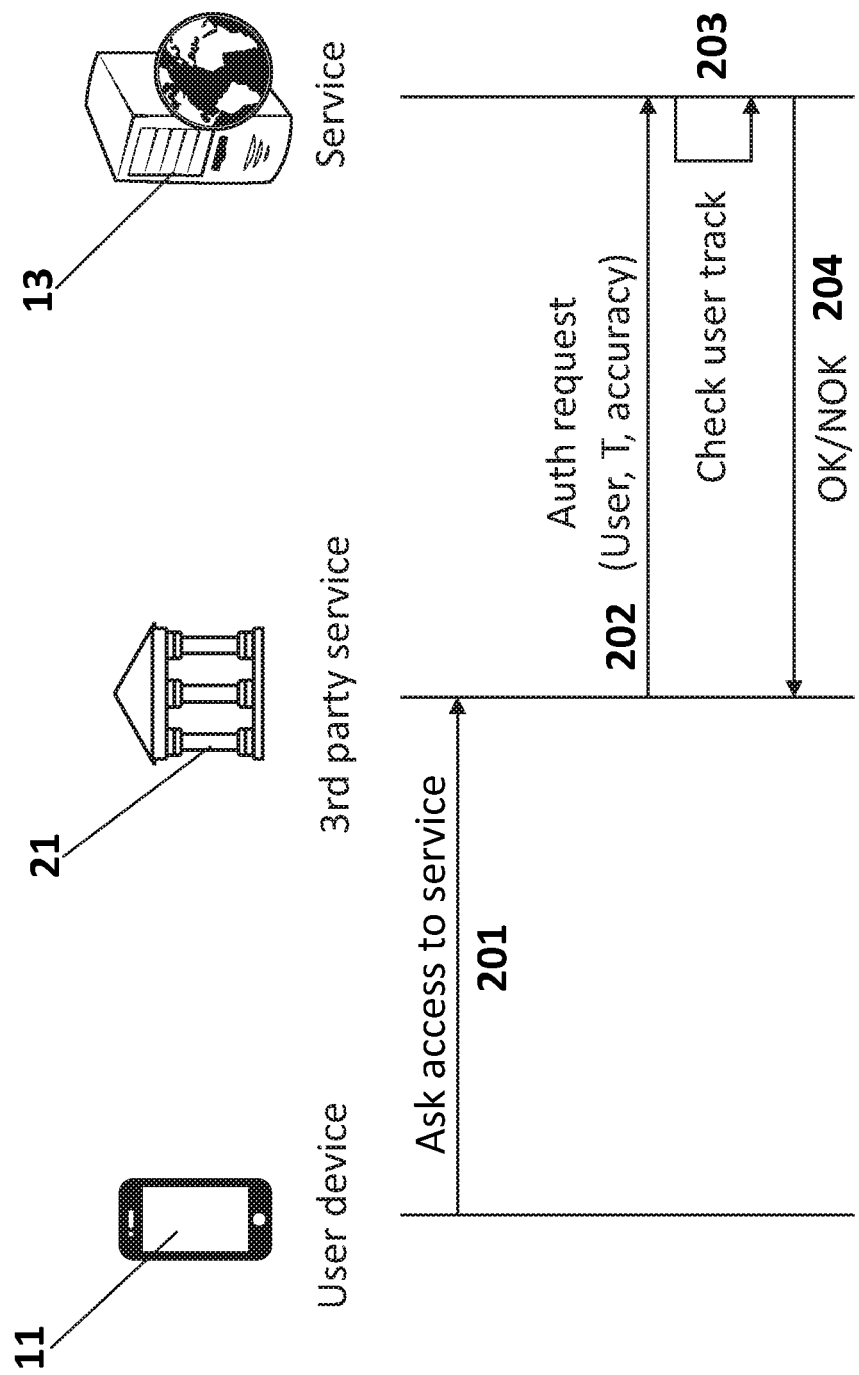
FIG. 2 shows a time diagram of a service access and authorization/denegation, according to a possible embodiment of the invention.
Figure 3:
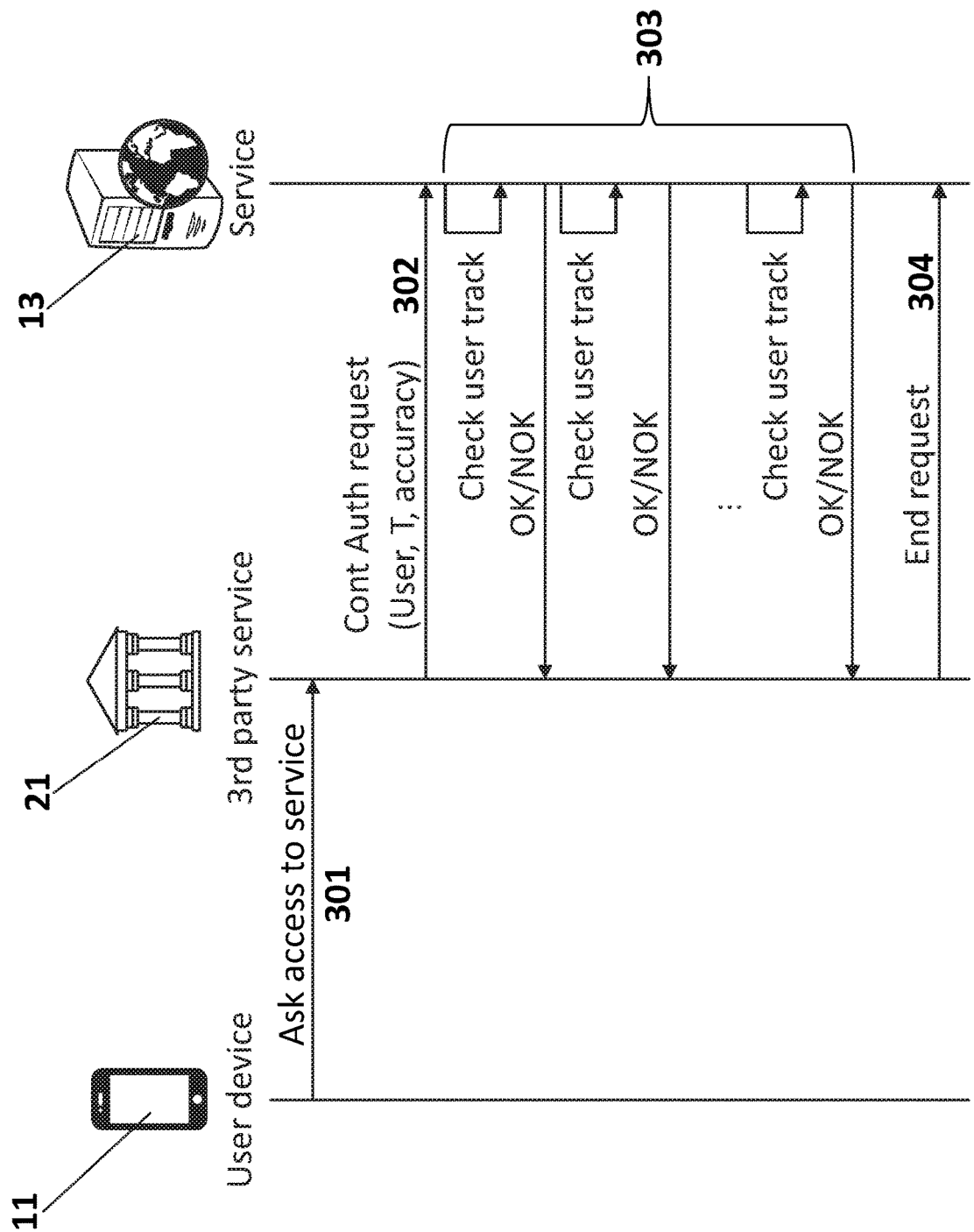
FIG. 3 shows a time diagram of a service access over time and authorization/denegation, according to another possible embodiment of the invention.

An example timeline for possible implementations of the proposed method is reported in FIGS. 1-3. FIG. 1 reports a possible implementation of a user interacting with network elements, which report to the proper service in the provider's network each interaction, specifying the timestamp t of the interaction, as well as all the required parameters. The service is hence collecting interactions into the user's trace, periodically extracting the user fingerprint, and checking for anomalies.

FIG. 1 shows a mobile device (11), e.g., a mobile phone, a tablet, a notebook, etc., engaged to a network element (12), e.g., any Access Point of a wireless communication network, through which the user of the mobile device (11) is provided with network services of a network provider (13). A set of three elements is defined to be used as basis of the proposed authentication system:

A mobile device (11), on which a specific application is installed;
A SIM card, active in the mobile device (11);
A user operating the mobile device (11).

The mobile device (11) is identified by the specific instance of the application it is running. The SIM card is unique and associated to a specific physical person: the user. The user is identified by the pattern of their interactions with specific network elements (timestamp of the interaction, kind of interaction, network element with which the interaction happened).

Whenever a user authentication is requested for the user, a check is performed on the three elements. If all the elements are recognized and match the user profile created and stored in the backend of the authentication service, the user is authenticated. Otherwise, the user is not authenticated.

In a possible implementation, as shown in FIG. 1, a user is interacting through a mobile device (11) with network elements (12), which in turn reports to the proper service in the network provider (13), which has already access to a track of the required information with the state-of-the-art systems in order to manage the network functioning and provide the user with network services, keeps track of any user interaction (101) with any network element (12) in a database, building or computing (103) a Network Interaction Track (NIT) as an array/record of the following information received (102) for each network interaction (101) of a user:

A unique identifier of the information record, which may be a function of the—unique—identifier of the SIM card.
An identifier of the mobile device (11), through the instance of the application running there.
A timestamp (t) of the network interaction.
A unique identifier of the network element which the user is interacting with. Note that this information is used to estimate the user location. As an alternative, the user location may be estimated more precisely, adding information also on the signal strength and/or triangulating the signal. Studies have shown as the simple network element identifier represents a strong enough measurement for the user unique identification, but further elements (e.g., signal strength and/or triangulation, etc.) may be added to make the measurement more precise and the error probability lower.
The type of the interaction (101), e.g., turn on/off the phone, making/receiving a call, location change, i.e., tower change, technology change, i.e., shifting between 2G, 3G, 4G, etc., request to data access via 2G, 3G, 4G, SMS sending/receiving, network ping exchange for alive confirmation, etc. Note that only the type of interaction is relevant and hence tracked, not the activity content (e.g., SMS transmission, not the SMS content). This allows to guarantee the user privacy in accordance with the international legislation on data processing and treatment.

Therefore, the provider (13) does not need to collect any other information for the said user, beyond what is collecting and processing already to provide said user with the communication services said user contracted the operator.

In a possible implementation of the proposed solution, the array of NITs of a user is automatically analyzed to extract a spatiotemporal fingerprint for the corresponding user with a frequency that may be set by the system manager, e.g., daily.

The user authentication in FIG. 1 consists only of collecting interactions into the user's trace, periodically extracting the user fingerprint, and checking for anomalies.

In another possible implementation, shown in FIG. 2:
i. a third-party (21), e.g., a bank service, is configured to ask the network provider (13) for an authentication check (202) of a user asking access (201) from his/her mobile device (11) to the service of the third-party (21); for the authentication check (202) requested by the third-party (21), the user identifier and an accuracy parameter, which may be a percentage of accuracy or a time interval (T), are specified;

ii. the network provider (13) checks (203) the profile of the selected user and identifies if any change in the track or NIT of the user interaction pattern, mobile device and SIM card has happened, over the specified time interval or respecting the specified accuracy;

iii. then the network provider (13) replies to the third-party (21) with an authentication result indication (204) of success or failure (OK/NOK) for the specified user.

In a further possible implementation, shown in FIG. 3, the network provider (13) constantly monitors (303) the NIT of users in order to detect anomalies and signal them to a third-party (21) providing a service, e.g., bank service, to which users are asking access (301) from their mobile devices (11). As soon as an anomaly is detected, the third-party (21) requesting said continuous authentication check (302) is notified, to guarantee a minimum time response. In the case an anomaly is detected, the third-party (21) sends an end of the request (304) and may ask a new confirmation of some kind to the user.

In the embodiments of FIGS. 2 and 3, the third-party (21) is the one in charge of sending a request (202, 302) to the network service provider (13) in order to check the authentication status of a user. FIG. 2 particularly shows a possible implementation of a scenario where the third-party (21) requests a one-time authentication, this scenario may reflect services needing single authentications, like door opening, operation authorization, etc. As an alternative, the third-party (21) may request a continuous time authentication over a specified time window, or until an end is specified, as shown in FIG. 3; this scenario may reflect services needing a continuous authentication over the usage period, like renting a scooter/bicycle/motorcycle/vehicle/van, etc.

The request specifies a user identifier, a time frame (T) over which the track is to be checked for authenticity and the required accuracy. The user track is just checked as specified and an answer is returned to the third-party.

The accuracy parameter may be negotiated between the network provider (13) and the third-party (21), on the basis of the third-party needs: for example, a higher accuracy or a check over a longer period translates to higher computational complexity for the network operator, which may charge a higher fee for that. At the same time, the third-party (21) may require different accuracy levels for different kinds of operations, depending on their criticality.

Figure 4:
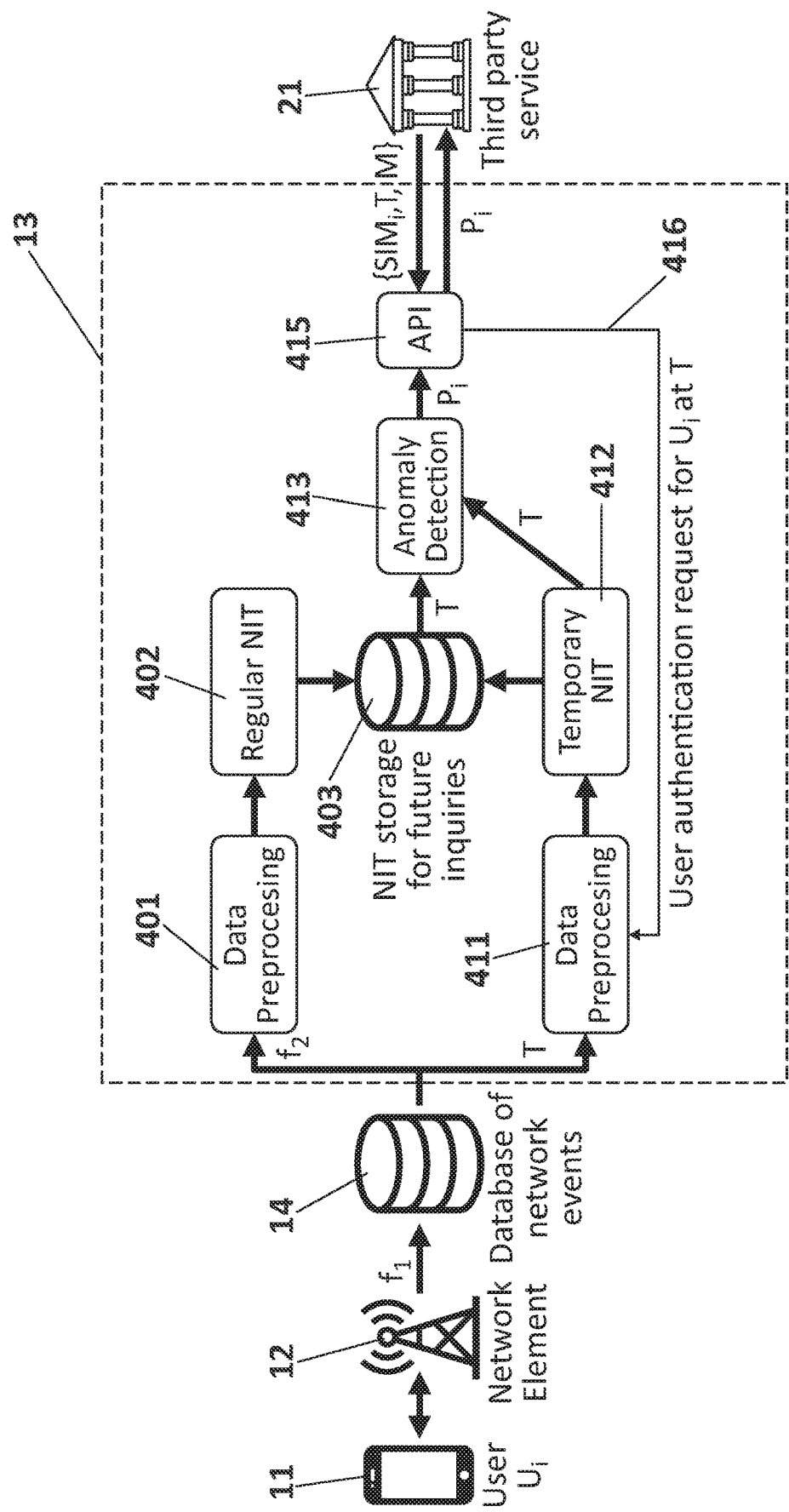
FIG. 4 a schematic diagram of the system architecture for authentication through mobility traces, according to a preferred embodiment of the invention.

According to a preferred embodiment, a possible architecture implementing the described method is shown in FIG. 4. In particular, in this implementation example, a user $U_i$ normally interacts with the mobile network through a mobile device (11) as usual. The interactions are recorded by the, one or more, network element(s) (12) with which the mobile device (11) is interacting and are stored in a database (14) of network events with a first set frequency $f_1$. Recorded interactions may include, but are not limited to, turning on/off the phone, making/receiving a call, location change, i.e., tower change, technology change, i.e., shifting between 2G, 3G, 4G, etc., request to data access via 2G, 3G, 4G, SMS sending/receiving, network ping exchange for alive confirmation, etc. These interactions are recorded together with the timestamp (T) and unique identifiers of the: i) mobile device (11), ii) user based on the SIM card identifier, and iii) network element. With a second set frequency $f_2 > f_1$, data in the network element database (14) are processed (401) to generate a regular NIT (402), which is stored into a NIT database (403) in the network.

At any time given by the timestamp T, a third-party service (21) may request an authentication status for a specific user $U_i$, by specifying the user's identifier, e.g., SIM Card identifier ($SIM_i$), and a user authentication request mode (M) selected from i) single authentication (M=0) or ii) continuous authentication, specifying an authentication period in the case (M>0 for an authentication executed every M seconds until a stop message is received by the third-party service). In this case, the application programming interface or API (415), interfacing the proposed user authentication service implemented at the network service provider (13) with the third-party service (21), triggers a user authentication request (416) and eventually a following one at a next time T+M, if M>0). The request (416) triggers a data retriever from the database (14) of network events to fetch and process (411) the latest data for the specified user $U_i$. A temporary NIT (412) is hence computed for the user $U_i$; a granularity or accuracy of the temporary NIT (412) may also be specified by the third-party service (21) or previously agreed between the network provider (13) and the third-party service (21)—as specified above—, and compared with the regular NIT (402) generated for the same user $U_i$. On the basis of the similarity, an authentication probability ($P_i$) is computed and returned to the third-party service (21). Similarity here can be computed using simple techniques such as cosine similarity between the two, regular and temporary, NITs (402, 412), considered respectively as historical and temporary spatio-temporal vectors of the user under examination. Also, more advanced statistical methods based on machine-learning principles can be used, to train a model per user based on their produced (historical) NITs, and then anomalies (413) can be detected by inferring if the temporary NIT is satisfying the trained model or not.

In the case of continuous authentication, mode M>0, each subsequent triggered authentication request triggers a new one after M seconds, while an eventual stop message from the third-party service (21) removes the following queued authentication request so that no further ones are generated.

Special situations may prevent an authentic user to be authenticated by the proposed system, e.g., traveling to another place (for tourism, business, etc.), or moving, or performing extra-ordinary activities, having to replace the SIM card and/or the mobile device, etc. Depending on the selected time interval and accuracy level, a short alteration of the user routine may or may not be detected as a change in the user profile. In a possible implementation, exceptions may be preemptively asked by the user, knowing a change is going to happen. As an alternative, these exceptions can be detected by the system and an alert may be triggered to the third-party service suggesting a new authentication request is needed from the user. These exceptions may include, for instance, traveling outside their standard mobility pattern, altering their fingerprint, resulting in a failure to authenticate. If the user asks for an exception, an alternative authentication method may be used for the exception duration. If the user does not ask for the exception, when the system detects it, the third-party service is alerted about the anomaly so that the third-party service can ask for further confirmation by the user and/or proceed with an alternative authentication method, eventually invasive for the user (i.e., involving direct and active user interaction), but just covering the exception duration.

A user changing his/her SIM card and/or mobile device will naturally lose their ability to be authenticated by the system for as long as a new fingerprint is generated in the system which is stable enough to result in the accuracy required by the corresponding third-party requesting the authentication. As such, a user knowing in advance they are going to change the SIM card and/or mobile device may agree on an exception for the authentication mechanism with the third-party, e.g., two-factor authentication, similarly to above. If the user is not asking for the exception in advance, again, the system can detect the anomaly and trigger a signaling to the third-party service, similarly to above. The third-party service may then ask for alternative authentication methods. Still, these exceptions are only valid for specific cases, while, for the rest of the time, the proposed solution offers continuous, seamless authentication.

Note that in this text, the term "comprises" and its derivations (such as "comprising", etc.) should not be understood in an excluding sense, that is, these terms should not be interpreted as excluding the possibility that what is described and defined may include further elements, steps, etc.

What is claimed is:

1. A method for authenticating users of mobile communication devices through mobility traces, comprising the following steps:
   recording one or more interactions of a user with at least one network element through a mobile device of the user subscribed in a network service provider;
   wherein further comprising the following steps:
   recording, by the at least one network element, a timestamp (T), associated with the recorded interactions, a unique identifier of the mobile device, a unique identifier of the user and a unique identifier of the network element;
   by using all the data recorded in the previous steps, computing a network interaction track, NIT, by the network service provider;
   by using the computed NIT, obtaining at the network service provider an authentication result indicating either a success or a failure of the user authentication;
   sending an authentication status check request to the network service provider from a third-party service provider to which the user is asking access through the mobile device, the authentication status check request comprising the user identifier and the timestamp (T) for which the authentication status is requested to be checked, and sending the authentication result from the network service provider to the third-party service provider,
      wherein the authentication status check request further comprises a user authentication request mode selected from single authentication and continuous authentication and, if the user authentication request mode selected is continuous authentication, the authentication status check request further comprises an authentication time period, and
   wherein the authentication result is obtained by the network service provider and sent to the third-party service provider periodically for every authentication time period until an end of the user authentication request is received from the third-party service provider at the network service provider;
   and wherein computing the NIT by the network service provider comprises generating a regular NIT at a time instant t=T, being T the timestamp, and generating at least one temporary NIT at a next time t'=T+M, being M the authentication time period, and wherein obtaining the authentication result by the network service provider comprises comparing the at least one temporary NIT with the regular NIT generated for the same user to detect anomalies.

2. The method according to claim 1, wherein the authentication status check request (202, 302) further comprises an accuracy parameter, the accuracy parameter being provided by the third-party service provider or negotiated between the network provider and the third-party service provider.

3. The method according to claim 1, wherein the anomalies are detected by using similarity techniques or machine-learning techniques and the authentication result is an authentication probability computed based on the anomalies and returned to the third-party service provider.

4. The method according to claim 1, wherein the unique identifier of the user is based on an identifier of a SIM card active in the mobile device.

5. The method according to claim 1, wherein the recorded interactions are turning on/off the mobile device, making/receiving a call in the mobile device, location change of the network element, technology change of the mobile communication, request to data access via the mobile communication technology, SMS sending/receiving, or network ping exchange for alive confirmation.

6. A system for authenticating users of mobile communication devices through mobility traces, comprising:
   a server of a network service provider to which a user is subscribed, the server being configured to:
      retrieve and process (401, 411) data records stored in a network events database, the data records comprising data of one or more interactions of the user with at least one network element through a mobile device of the user, a timestamp (T) associated with the recorded interactions, a unique identifier of the mobile device, a unique identifier of the user and a unique identifier of the network element;
      compute at least one network interaction track, NIT, by using the retrieved data;
      obtain an authentication result indicating either a success or a failure of the user authentication based on the at least one computed NIT;
   wherein the system further comprising:
   an application programming interface interfacing the server of the network service provider with a third-party service, the application programming interface configured to receive an authentication status check request from the third-party service provider, the authentication status check request comprising the user identifier and the timestamp (T) for which the authentication status is requested to be checked;
   a database for storing the at least one NIT computed by the server and wherein the server is configured to generate a regular NIT at a time instant t=T, being T the timestamp and the regular NIT generated by using the data retrieved from the network events database associated with the timestamp (T) for which the authentication status is requested to be checked;
   and wherein the authentication status check request further comprises an authentication time period (M) and wherein the server is configured to generate at least one temporary NIT at a next time t'=T+M, being M the authentication time period, and wherein the authentication result is obtained by comparing the at least one temporary NIT with the regular NIT generated for the same user to detect anomalies, and wherein the server is configured to compute an authentication probability based on the anomalies and return the the authentication result based on the authentication probability to the third-party service provider through the application programming interface.

7. The system according to claim 6, wherein the network element is an access point of a wireless communication network.

8. The system according to claim 6, wherein the mobile device is a mobile phone, a tablet or a notebook.

* * * * *